(12) United States Patent
Sokołowski et al.

(10) Patent No.: US 12,486,028 B2
(45) Date of Patent: Dec. 2, 2025

(54) HEAT SHIELD PANEL CONNECTOR

(71) Applicant: Goodrich Corporation, Charlotte, NC (US)

(72) Inventors: Marcin Szymon Sokołowski, Wojsławice-Kolonia (PL); Bartłomiej Kamil Żuk, Legnica (PL)

(73) Assignee: GOODRICH CORPORATION, Charlotte, NC (US)

( * ) Notice: Subject to any disclaimer, the term of this patent is extended or adjusted under 35 U.S.C. 154(b) by 584 days.

(21) Appl. No.: 17/890,992

(22) Filed: Aug. 18, 2022

(65) Prior Publication Data
US 2023/0098613 A1    Mar. 30, 2023

(30) Foreign Application Priority Data
Sep. 24, 2021 (EP) .................................. 21461602

(51) Int. Cl.
| B64C 25/36 | (2006.01) |
| B60B 21/00 | (2006.01) |
| F16B 5/07 | (2006.01) |
| F16D 65/02 | (2006.01) |
| F16D 65/78 | (2006.01) |

(52) U.S. Cl.
CPC ............ B64C 25/36 (2013.01); F16B 5/07 (2013.01); F16D 65/78 (2013.01); B60B 21/00 (2013.01); F16D 2065/1384 (2013.01); F16D 2065/785 (2013.01)

(58) Field of Classification Search
CPC . B64C 25/36; B64C 25/42; F16B 5/07; F16D 65/78; F16D 2065/1384; F16D 2065/785; B60B 21/00; B60R 13/0876

USPC ............................................... 301/6.91
See application file for complete search history.

(56) References Cited

U.S. PATENT DOCUMENTS

| 5,002,342 A | 3/1991 | Dyko |
| 9,908,375 B2 * | 3/2018 | Baden ............... F16D 65/847 |
| 10,330,163 B2 * | 6/2019 | French ............... B64C 25/42 |

(Continued)

FOREIGN PATENT DOCUMENTS

| DE | 202016102418 | 8/2017 |
| EP | 3480072 | 5/2019 |

(Continued)

OTHER PUBLICATIONS

EPO, Extended European Search Report dated Mar. 2, 2022 with EP Serial No. 21461602.1.

Primary Examiner — S. Joseph Morano
Assistant Examiner — Eva L Comino
(74) Attorney, Agent, or Firm — SNELL & WILMER L.L.P.

(57) ABSTRACT

An attachment assembly for connection two panels of a heat shield assembly, the attachment assembly comprising: a first attachment feature to be provided, in use, extending from a first edge of a first panel of the heat shield and a second attachment feature to be provided, in use, on and to extend from a second edge of a second panel to be attached to the first panel; wherein the first attachment feature comprises a tab portion extending from a first end attached, in use to the first edge of the first panel, a bend at the other end of the tab portion, and a hook portion extending from the bend in a direction generally circumferentially towards the first end but at an angle to the tab portion.

11 Claims, 3 Drawing Sheets

(56) References Cited

U.S. PATENT DOCUMENTS

| | | | | |
|---|---|---|---|---|
| 2013/0015697 | A1* | 1/2013 | Hall | B64C 25/36 |
| | | | | 188/264 G |
| 2019/0367147 | A1* | 12/2019 | Vichniakov | B29C 66/0222 |
| 2021/0018055 | A1* | 1/2021 | Miller | F16D 55/36 |

FOREIGN PATENT DOCUMENTS

| | | | | |
|---|---|---|---|---|
| EP | 3702275 A1 * | 9/2020 | | B60B 27/0052 |
| EP | 3842339 A1 * | 6/2021 | | B60C 23/18 |

* cited by examiner

HEAT SHIELD PANEL CONNECTOR

CROSS-REFERENCE TO RELATED APPLICATIONS

This application claims priority to, and the benefit of, EP Patent Application No. 21461602.1, filed Sep. 24, 2021 (DAS Code 3ACF) and titled "HEAT SHIELD PANEL CONNECTOR," which is incorporated by reference herein in its entirety for all purposes.

FIELD

The present disclosure relates to a connector design for connecting panels or segments of a heat shield assembly for a wheel for a vehicle especially, but not exclusively, for an aircraft wheel.

BACKGROUND

Wheels on aircraft and other vehicles are often provided with a brake assembly comprising a stack of brake discs mounted inside the wheel, within the tube well of the wheel. The brake operates by compressing the brake discs together to slow and stop rotation of the wheel. The friction between the pressed brake discs generates a large amount of heat which can cause damage to the wheel and/or tires. It is conventional to provide a heat shield between the brake assembly and the wheel rim or tube well to reduce the effects of the heat generated by braking on the wheel parts. The heat shield can also catch hot brake material that is ejected from the brake discs during braking, before it strikes the wheel.

Various types of heat shield are known but, typically, heat shields are in the form of metal sheets or panels provided concentric with the wheel tube well and spaced a small distance from the tube well. The heat shield can be provided as a single cylindrical piece but more typically is formed as a number of arcuate panels or sections that are attached together to form a complete cylindrical heat shield. Typically, the edges of the panels that are to be attached to an adjacent panel are provided with a hook connector part that hooks together with a corresponding hook connector part on an adjacent panel.

Particularly with the increased use of carbon disc brakes, which have greater energy absorption capability than steel brakes and are significantly lighter, but which are larger than steel brake discs Although it is important for the heat shields to be robust, there is also a need for them to be as simple and lightweight as possible. In aircraft in particular, but also in other vehicles with braked wheels, there is a need to minimize the weight and size of the wheel assembly. Heat shields are therefore, often made of thin metal panels but may be arranged as two or more layers of panels with an insulation gap therebetween.

Because of the high temperature and high stress/vibrational environments that braked wheels operate in and high centrifugal forces acting on the heat shields, as well as changes in tire pressure, the heat shield can be caused to deform and/or deflect. This can cause high stresses on the heat shield and can cause the heat shield to come into contact with the wheel tube well which can, in turn, result in wheel abrasion. The connectors used to join adjacent panels comprise two engaging or interleaving hook parts resulting in a seam that is thicker than the individual panels themselves and the seams provide points around the heat shield that are even more likely to contact the wheel tube well during movement and/or if the heat shield panels are deflected or deformed. This is even more of an issue for carbon brakes because they are larger and so there is less space between the discs and the wheel.

There is a need for a heat shield assembly which is less prone to deflection and deforming and also an improved connector, so as to avoid or reduce damage to the heat shield and to avoid or reduce wheel abrasion.

SUMMARY

According to the present disclosure, there is provided an attachment assembly for connection two panels of a heat shield assembly, the attachment assembly comprising: a first attachment feature to be provided, in use, extending from a first edge of a first panel of the heat shield and a second attachment feature to be provided, in use, on and to extend from a second edge of a second panel to be attached to the first panel; wherein the first attachment feature comprises a tab portion extending from a first end attached, in use to the first edge of the first panel, a bend at the other end of the tab portion, and a hook portion extending from the bend in a direction generally circumferentially towards the first end but at an angle to the tab portion, and wherein the second attachment feature comprises a tab portion extending from a first end attached, in use, to the second edge of the second panel, and a U-shaped hook portion defined by a first leg extending from a second end of the tab portion generally circumferentially away from and at an angle to the tab portion, and a second leg extending back up towards the second end of the tab portion but defining a hook receptacle between the first and second legs, the hook receptacle arranged to receive the hook portion when the first and second attachment features are brought into engagement by sliding the hook portion into the hook receptacle of the second attachment feature.

Also provided is a heat shield assembly and a wheel assembly.

BRIEF DESCRIPTION OF THE DRAWINGS

The assembly according to the disclosure will be described, by way of example only, with reference to the drawings. Variations and modifications are possible within the scope of the claims.

DETAILED DESCRIPTION

Figure 1:
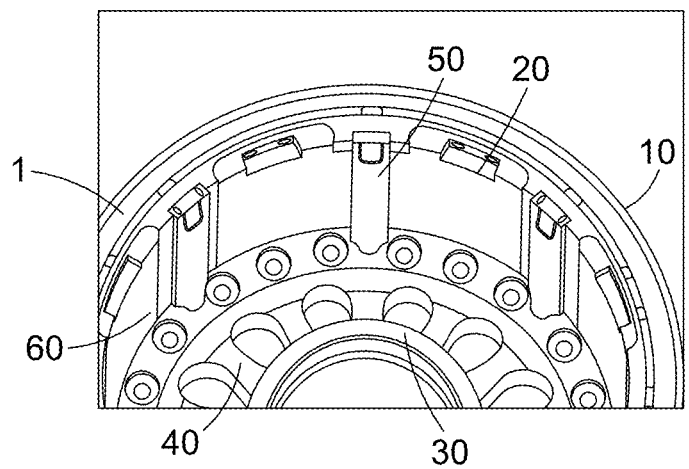
FIG. 1 shows an example of a heat shield in a wheel.

FIG. 1 shows a section of a typical wheel assembly comprising a wheel rim or tube well 1 having an outer diameter surface 10, on which a tire (not shown) will usually be mounted, and an inner diameter surface 20 defining an interior cavity in which a brake assembly (not shown) will typically be arranged around a wheel hub 30. The hub 30 would be attached by bearing to an axle (not shown). The hub 30 is connected to the wheel rim 1 via a web 40. Rotor disc drive lugs 50 extend axially across the tube well 1 for engagement with the brake discs.

Figure 2:
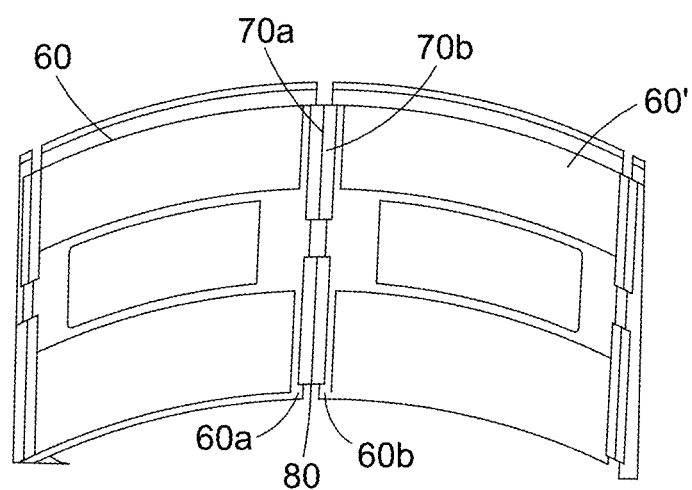
FIG. 2 shows the seam connection between adjacent panels in a conventional assembly.

To protect the wheel rim 1 from the heat generated during hard braking or from brake disc material ejected during braking, a heat shield is mounted to the inner diameter surface 20 of the wheel. The heat shield may be a single tubular shield or, as shown in this example, may be formed of several heat shield panels 60 provided between the rotor drive lugs 50. The heat shield/panels 60 is in the form of an arcuate thin metal sheet or several thin metal sheets and is attached to the wheel so as to be spaced apart from the wheel inner diameter surface by a small insulation gap (not shown). Where the heat shield is made of a number of panels or segments attached together, the adjoining edges 60*a*, 60*b* of the panels are provided with complementary attachment features 70*a*, 70*b*. During assembly, the attachment features 70*a* of one panel are engaged with the attachment features 70 of an adjacent panel to lock the panels together. The engaged attachment features 70, 70*b* define a seam 80 between adjacent panels. This can be best seen in FIG. 2.

Figure 3:
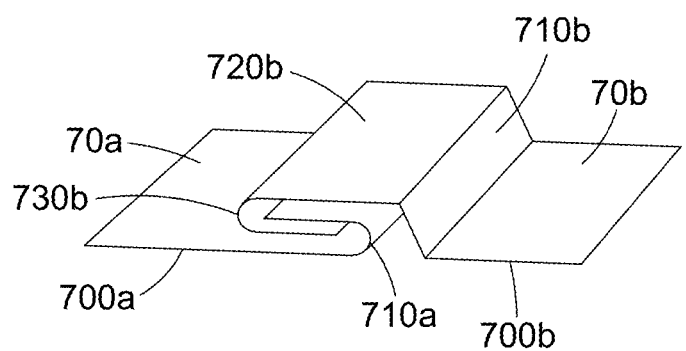
FIG. 3 shows a conventional hook arrangement forming the seam connection as in FIG. 2.

Typical attachment features are shown in FIG. 3 and define a hook attachment wherein a first attachment feature 70*a* on one panel has a first tab portion 700*a* extending from the edge 60*a* of the panel and leading into a bend portion 710*a* where the attachment feature bends back on itself to define an essentially U-shaped hook. The corresponding attachment feature 70*b* of the adjacent panel edge 60*a* also has a tab portion 700*b* extending from the panel edge 60*b*. This leads into a step portion 710*b* leading essentially radially or at an angle from the tab portion to define a clearance for receiving the hook of the first attachment feature. The step portion then continues to define another axially extending tab portion 720*b* which then bends back on itself at a bend portion 730*b* to define a U-shaped hook that hooks into the hook of the first attachment portion when the adjacent panels are fitted to each other. The movement of the panels, and therefore the attachment features, to ensure the hooked engagement, is an essentially horizontal or circumferential direction movement. The region where the two attachment features engage, defined by the step portion and the engaging hook portions has a thickness greater than the thickness of the tab portions and also than the panels themselves. In the conventional assembly, this thickness is accommodated in the area between the heat shield and the wheel rim. Typically, retainers 90 e.g. formed as metal clips, are provided at the ends of the panels, extending across the hook parts of engaging attachment features so as to prevent disengagement by axial movement of the panels.

As mentioned above, in the harsh braking conditions experienced by e.g. wheels on an aircraft landing gear, high temperatures are reached and pieces of hot material can break off from the rotor discs. All of this can cause the heat shield panels to deform or deflect and be damaged and/or to contact the wall by being deflected into the insulation gap. Because the hooked engagement between adjacent panels extends into the space between the heat shield and the wheel rim, deformation of the panels can cause the attachment features to contact the wheel rim and this can result in damage and wheel abrasion. This can cause wheel abrasion and require the entire wheel assembly to be replaced.

Figure 4:
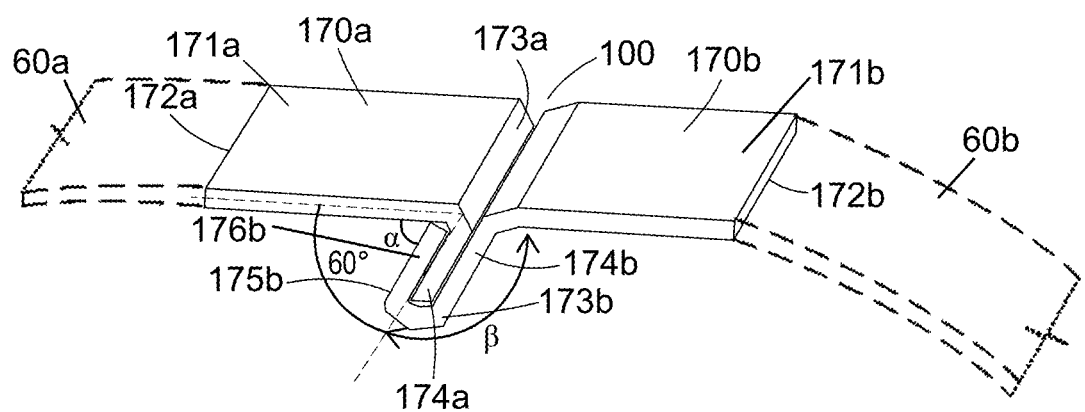
FIG. 4 shows a hook arrangement according to the present disclosure.
Figure 5A:
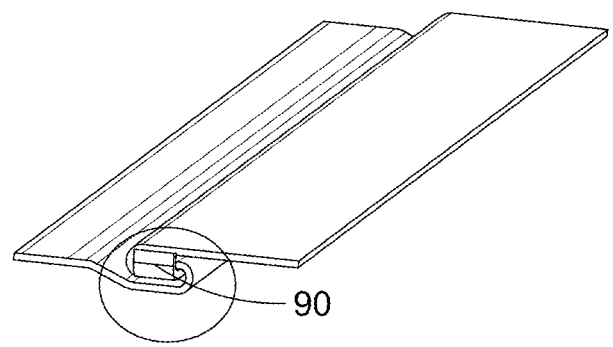
FIG. 5A shows a perspective view of a conventional assembly to show retainers provided to prevent axial movement between the panels.
Figure 5B:
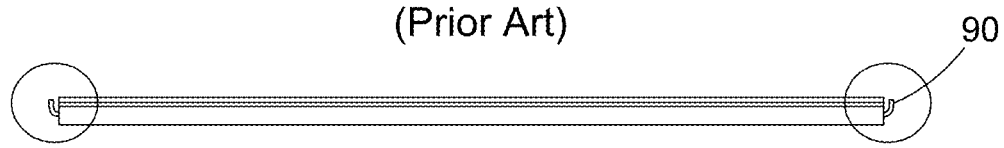
FIG. 5B is a side view of FIG. 5A
Figure 6A:
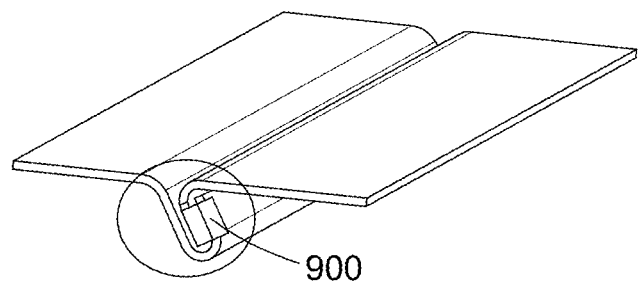
FIG. 6A is a perspective view of the assembly according to the disclosure showing modified retainers.
Figure 6B:
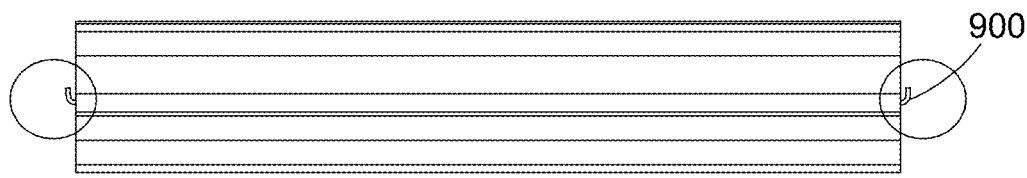
FIG. 6B is a side view of FIG. 6A.

FIG. 4 shows an attachment assembly 100 modified according to the disclosure to add stiffness and strength to the heat shield whilst minimizing the thickness of the attachment assembly in the space between the heat shield and the wheel, so reducing the effects of deformation or deflection of the panel, to avoid or mitigate the problems mentioned above. The assembly also simplifies assembly of the heat shield.

As shown in FIG. 4, the shape of the attachment assembly parts is different from the hook structures of the prior art as shown in FIG. 3. In the assembly according to the disclosure, the attachment assembly comprises a first attachment feature 170*a* to be provided extending from an edge 60*a* of a first panel of the heat shield and a second attachment feature 170*b* to be provided on and to extend from a second edge 60*b* of a second panel to be attached to the first panel. The first attachment feature 170*a* has a tab portion 171*a* extending from a first end 172*a* attached, in use to the first edge of the first panel, a bend 173*a* at the other end of the tab portion and a hook portion 174*a* extending from the bend 173*a* in a direction generally towards the first end 172*a* but at an angle to the tab portion 171*a*. The second attachment feature 170*b* has a tab portion 171*b* extending from a first end 172*b* attached, in use, to the second edge of the second panel, and a U-shaped hook portion 173*b* defined by a first leg 174*b* extending from a second end 175*b* of the tab portion 171*b* generally away from and at an angle to the tab portion 170*b* and a second leg 175*b* extending back up towards the second end of the tab portion but defining a hook receptacle 176*b* between the first and second legs arranged to receive the hook portion 174*a* when the first and second attachment features are brought into engagement by sliding the hook portion 174*a* into the hook receptacle of the second attachment feature. The hook receptacle of the second attachment feature preferably defines an angle β of greater than 90 degrees to the tab portion and the hook portion 174*a* of the first attachment portion preferably defines an angle α of greater than 45 degrees to the first tab portion 171*a*. Preferably the sum of angle α and angle β is approximately 180 degrees such that the two tab portions 171*a*, 171*b* lie in essentially the same plane, together forming a flat top surface when the two attachment features are connected. In the example shown, the angle between the first tab portion 171*a* and the hook portion 174*a* is 60 degrees, but this angle can vary depending on the assembly requirements. The angle α should be sharp enough that the hook is securely held in the hook receptacle.

It can be desirable or even necessary to secure the panels against relative sliding movement. Retainers 900, similar to those described above, e.g. in the form of metal clips, are provided in a desired orientation to fit across the hook portion and the hook receptacle.

The attachment features are preferably arranged on the panel edges such that the plane formed by the two tab portions is on the side of the panels between the panel and the wheel rim and the hook features extend into the wheel from the heat shield towards the wheel hub. The attachment features in the space between the heat shield and the wheel rim, therefore, have a relatively small profile and are thus less likely to contact the wheel rim if the panel is deformed or deflected than in conventional assemblies.

The hook part of the attachment assembly extends into the wheel cavity radially inwards of the heat shield. Whilst this can cause issues due to contact with the brake parts, for example, in a preferred arrangement, use is made of the interior cavity that exists inside the rotor torque bars 50 and the attachment assembly is designed such that in use, the hook portion will fit inside this cavity of the rotor torque bars so that the attachment assembly does not take up additional space inside the wheel.

In an example, each panel is provided with two attachment features on each edge (which can be identical or complementary—i.e. one edge can have a first attachment feature and a second attachment feature or can have two first attachment features and the adjacent edge has two second attachment features). In other examples, each edge can have more than two, or only one, attachment feature.

To assemble the heat shield, two adjacent panels are connected by means of the attachment assembly. With the assembly of the disclosure, the engagement between the attachment features can be provided by moving the two panels essentially vertically relative to each other—i.e. radially relative to the wheel. This allows for simpler assembly that the horizontal or circumferential relative positioning required in conventional assemblies.

The attachment assembly of this disclosure provides additional strength to the heat shield and a secure connection between heat shield panels, whilst minimizing the risk of wheel abrasion due to deformation or deflection of the panels. The assembly is also lighter and simpler and less expensive than conventional hook attachments and uses les material.

What is claimed is:

1. An attachment assembly for connection of two panels of a heat shield assembly, the attachment assembly comprising:
a first attachment feature extending from a first edge of a first panel of the heat shield and a second attachment feature extending from a second edge of a second panel to be attached to the first panel;
wherein the first attachment feature comprises a first tab portion extending from a first end attached to the first edge of the first panel, a single bend at the other end of the first tab portion, and a hook portion extending from the single bend in a direction towards the first end but at a first acute angle to the first tab portion,
wherein the second attachment feature comprises a second tab portion extending from a first end attached to the second edge of the second panel, and a U-shaped hook portion defined by a first leg extending from a second end of the second tab portion away from and at a second obtuse angle to the second tab portion, and a second leg extending back up towards the second end of the second tab portion defining a hook receptacle between the first and second legs, the hook receptacle arranged to receive the hook portion when the first and second attachment features are brought into engagement by sliding the hook portion into the hook receptacle of the second attachment feature,
wherein the first acute angle is greater than 45 degrees but less than 90 degrees, and
wherein the second obtuse angle is greater than 90 degrees but less than 135 degrees such that the first acute angle and the second obtuse angle equal 180 degrees.

2. The assembly of claim 1, comprising two or more of said first attachment features and two or more of said second attachment features.

3. The assembly of claim 1, wherein at least one surface of the hook portion of the first tab portion of the first attachment feature lies along the same plane as at least one surface of the hook receptacle of the second tab portion of the second attachment feature when the first and second attachment features are in engagement.

4. A heat shield assembly for a wheel assembly, comprising a plurality of arcuate heat shield panels arranged to be connected together to form a heat shield to be attached to the interior of a wheel, and an attachment assembly as claimed in claim 1, for attaching adjacent panels.

5. The heat shield assembly of claim 4, wherein a first panel has one or more of said first attachment features along a first edge and one or more of said second attachment features along an opposite second edge.

6. The heat shield assembly of claim 4, wherein a first panel has one or more of said first attachment features and one or more of said second attachment features along a first edge and has one or more of said first attachment features and one or more of said second attachment features along an opposite second edge.

7. The heat shield assembly of claim 4, further comprising a retainer provided at each end of the seam between adjacent attached heat shield panels across the attachment assembly to prevent relative axial movement between the panels.

8. A wheel assembly comprising a wheel rim having a radially inner surface and a radially outer surface, and a heat shield assembly as claimed in claim 4 attached to and having a radially outer surface radially spaced from the radially inner surface of the wheel rim.

9. The wheel assembly of claim 8, wherein the tab portions of the first and second attachment features, when engaged, define a flat surface in the space between the radially outer surface of heat shield and the radially inner surface of the wheel rim.

10. The wheel assembly of claim 8, further comprising a plurality of torque bars arranged around the radially inner surface of the heat shield, and wherein the hook receptacle and hook portion of each attachment assembly is located within one of the plurality of torque bars.

11. The wheel assembly of claim 8 being a wheel assembly for the landing gear of an aircraft.

* * * * *